3,181,549
LIQUID LEVEL CONTROL SYSTEM
Joseph A. Perry, Jr., Cedar Rapids, Iowa, assignor to Cherry-Burrell Corporation, Cedar Rapids, Iowa, a corporation of Delaware
Filed Dec. 18, 1961, Ser. No. 160,221
7 Claims. (Cl. 137—118)

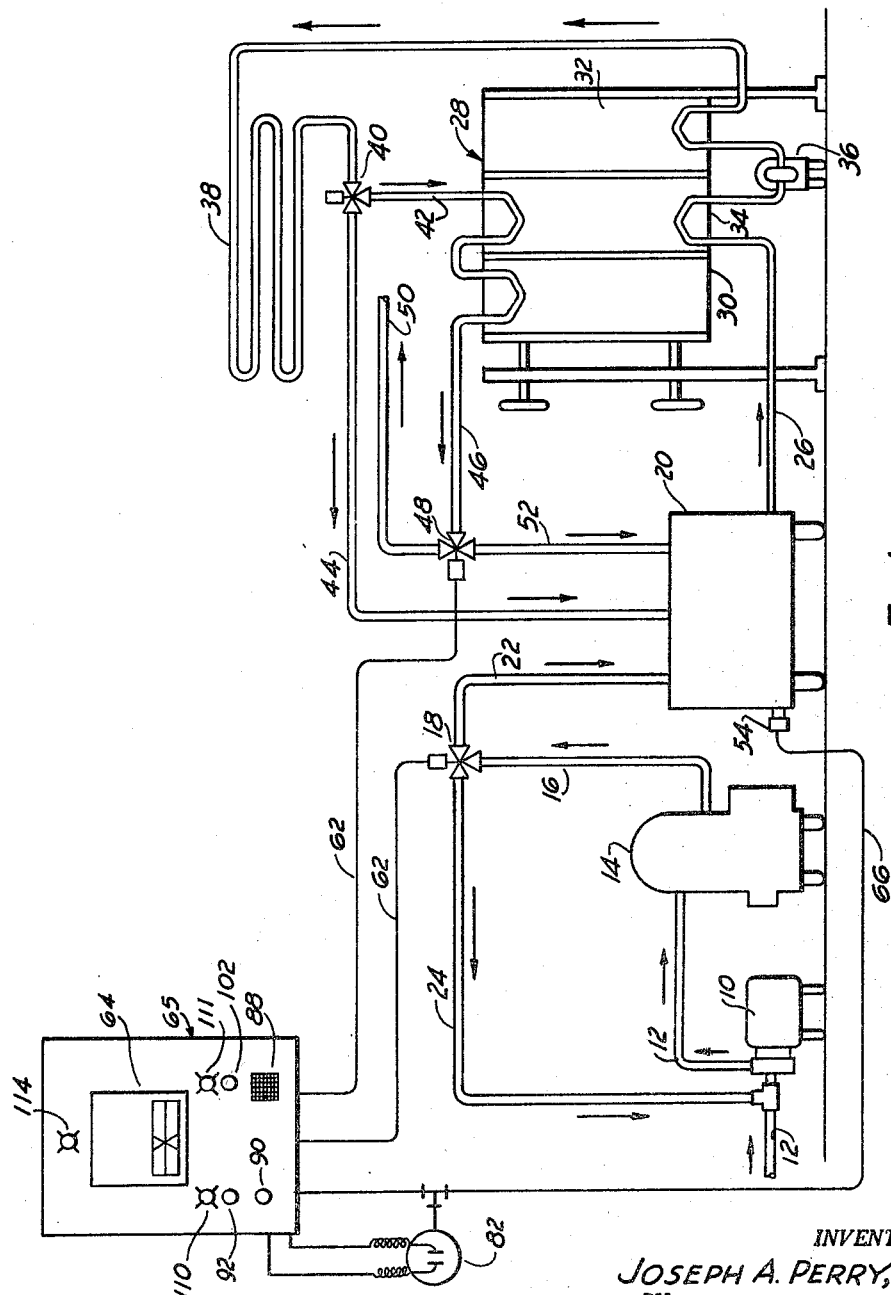

This invention relates to a liquid level control system and more specifically to means for controlling and maintaining the liquid level in a balance tank which is used in liquid processing systems, particularly pasteurization systems.

At the present time, the automatic control of the level of liquid in a tank or other vessel employed in a continuous processing system is usually accomplished by means of a float that either directly operates an inlet valve or indirectly through a control system regulates the flow of liquid into the tank. Systems employing a float as the basis of control perform only the function of maintaining a substantially constant level in the tank. None of these systems known to me provide other very desirable features, such as adjustable low-level alarm and control, and means easily to vary the desired operating level.

By "low-level control" I mean keeping air out of the system by automatically preventing the balance tank from running dry. Low-level control takes care of the emergency situation that sometimes occurs when the liquid supply to the tank fails. There is no means known to me to remedy such a situation automatically, and in some continuous processing systems in which a tank is used, it is very important that the tank not "run dry" at any time. For example, if the supply should fail in a milk pasteurization system employing a plate-type heat exchanger, the lack of milk flow through the heat exchanger will cause the milk to "burn on" the plates necessitating shutdown of the system and cleaning of the heat exchanger plates before operation can be started again. Because of sanitary requirements, a balance tank is used in the milk supply line to the heat exchanger, and if the supply of milk is cut off for even a short period of time, the milk in the tank will all be withdrawn. My system will automatically remedy a milk supply deficiency by allowing the pasteurization system to "idle" until the cause of the deficiency can be corrected. In other words, provision is made to maintain full flow through the heat exchanger by recirculating the pasteurized milk thus preventing the milk from baking on the heat exchange surfaces and clogging the flow paths.

It is therefore a primary object of my invention to provide automatic controls for a processing system that will at all times keep a full flow of fluid through the system by maintaining a minimum level in a tank to which the liquid is supplied, and from which it is withdrawn, even though the supply should fail.

It is another object of my invention to provide a system for controlling the liquid level in a tank that allows a predetermined level to be quickly and easily changed.

It is a further object of my invention to provide an automatic system that maintains a constant operating liquid level in a tank as long as the fluid supply is adequate, but if the fluid supply should fail and the liquid level fall to a certain preselected level, the lower level will be maintained by recirculation of the liquid and an alarm given to indicate that the supply has failed.

It is a further object of my invention to provide a balance tank liquid level control system for use in a pasteurization system because of either supply failure or a temporary shutdown in the processing line downstream from the pasteurization system.

It is a still further object of my invention to provide a liquid level control system that is simple and sanitary and one that can be easily incorporated into new systems or added to existing systems with a minimum of modification.

These and other objects of my invention will be readily apparent from a consideration of the following description taken in connection with the accompanying drawing in which:

FIG. 1 diagrammatically shows my novel liquid level control system as applied to a pasteurization system for liquids such as milk;

Figure 3:
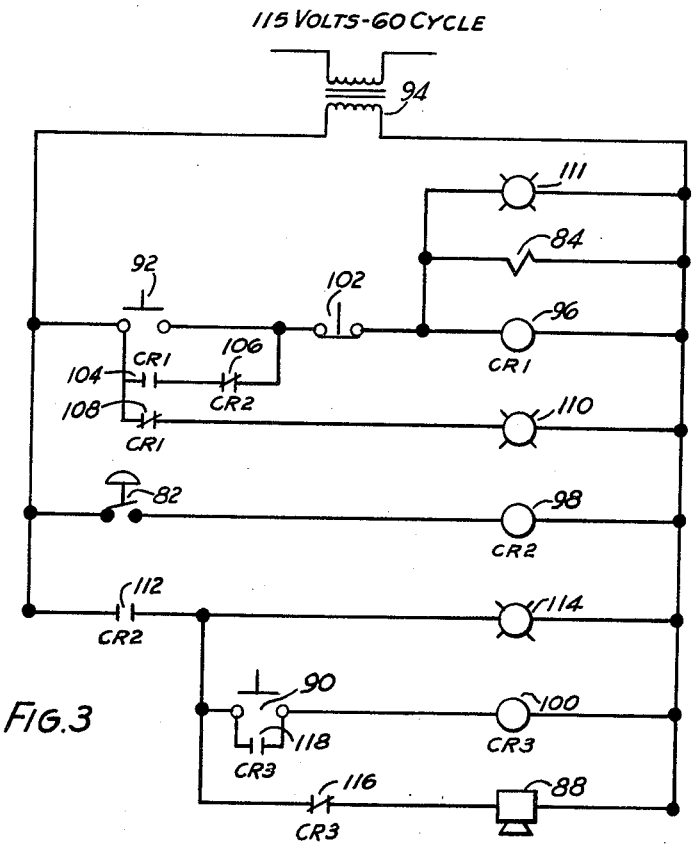
FIG. 3 is a schematic wiring diagram of the control system.

Referring to FIG. 1, the raw milk to be processed is circulated by pump 10 from a source of supply (not shown) through the supply line 12. In the system shown, a clarifier 14 is placed in the supply line 12 and the milk is discharged from clarifier 14 into line 16 that leads to a three-way valve 18, one outlet of which is connected to a balance tank 20 by line 22. Thus, valve 18 controls the milk supply. A by-pass line 24 is connected to the other outlet of valve 22 and leads back to the supply line 12 upstream from pump 10.

The particular setup described so far is the preferable arrangement when clarifier 14 is used in the system. However, if no clarifier is necessary, a two-way throttling type valve can be used in the discharge line from pump 10 to modulate the supply of milk to the tank 20.

As will be described more fully hereinafter, a predetermined level is maintained in the balance tank 20 to assure a steady flow of milk from the supply source through the pasteurizing system. The milk is withdrawn from the balance tank 20 through a line 26 and passed through the various stages of a heat exchanger, indicated generally by the reference numeral 28. Heat exchanger 28 is preferably of the plate type and consists of three sections, a cooler 30, a heater 32, and regenerator 34. The raw milk drawn off from the balance tank 20 through line 26 is passed through alternate spaces between the plates in the regenerator section 34 where the milk is preheated. A pump is located between the regenerator 34 and heater 32 and serves to pump the milk from the balance tank 20 through the remainder of the system. The milk is thereafter passed through the heater section 32 where the milk temperature is raised to pasteurization temperature and then held at that temperature for the required time in a holding tube 38. If the milk is at the required pasteurization temperature upon discharge from the holding tube 38, a flow diversion valve 40 will direct the flow of milk into a line 42 that carries the pasteurized milk back through alternate spaces between the plates of the regenerator 34 to pre-heat the incoming raw milk. The flow diversion valve 40 is operated in response to the temperature of the milk in holding tube 38 by suitable controls that are well known to those skilled in the art and therefore will not be described.

If the temperature of the milk discharged from the holding tube 38 is not up to the pasteurization temperature, the flow diversion valve 40 will divert the flow into a line 44 that returns the unpasteurized milk to the balance tank 20.

In a high-temperature, short-time milk pasteurization system, the pasteurized milk discharged from the regenerator 34 is then cooled in the cooling section 30 of the heat exchanger 28, and the cooled milk is then pumped into suitable storage facilities or to bottling equipment. However, in my novel system I provide in the discharge line 46 from cooler 30 a three-way valve 48 operable by means described hereinafter to direct the flow of pasteurized milk either to storage facilities (not shown)

through a line 50 or through a recirculation line 52 to the balance tank 20.

Preferably, valves 18 and 48 are both of the air-operated, automatic type and their settings depend upon the amount of liquid in the balance tank 20. Therefore, I have provided a pressure transducer 54 on tank 20 that senses the level of the liquid milk in the tank 20 and converts it into a usable indication. The pressure transducer 54 is preferably of the type disclosed and claimed in my co-pending U.S. patent application, Serial No. 100,583, now Patent No. 3,161,051 entitled "Level Indicating Device and System," filed April 4, 1961. Briefly, the basis of operation of this device is a pressure balance between the liquid pressure in the tank 20 and air pressure applied to the transducer 54. This applied pressure, of course, can be easily measured and read directly on a controller remotely located from the processing system. Changes in the liquid level, and thus in the applied air pressure, can also be used to actuate pressure switches or other control means which can be set to respond to a pressure corresponding to the desired liquid level in tank 20.

Figure 2:
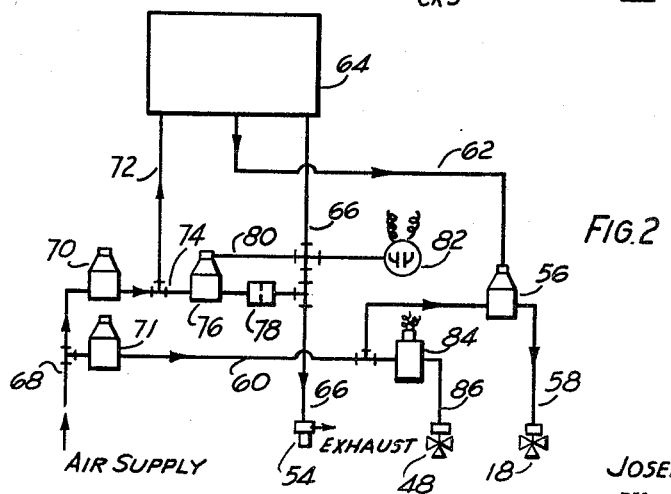
FIG. 2 shows the arrangement of the air control system.

A control system, which is primarily an air system, for carrying out the desired functions in the pasteurization system shown, will now be described in detail with reference to FIGS. 2 and 3.

As already mentioned, the balance tank control valve 18 preferably is of the air-operated type. Air pressure is supplied to the central portion of valve 18 through a regulator 56 in an air line 58 leading from air supply line 60. Regulator 56 varies the pressure in line 58 according to the "signal" received through air line 62 from a proportional type controller 64, of any suitable design, that is preferably located on a central control panel 65. The "signal," which is a static air pressure, depends upon the liquid level in balance tank 20, the level indication being transmitted in the form of pressure through line 66 to controller 64 from the transducer 54. Controller 64 may be set to maintain any desired level in tank 20.

Thus, when the liquid level in tank 20 falls below the set point of controller 64, the product pressure exerted on transducer 54 will decrease, and a corresponding lower pressure will be transmitted through line 66 to controller 64. A proportionally lower pressure will be sent to regulator 56 through line 62, and regulator 56 will operate to cause the control valve 18 to open further and increase the flow of milk into the tank 20. As the level in tank 20 rises, the change in liquid pressure sensed by transducer 54 will, by means of controller 64, vary the setting of valve 18 to slow down the flow of liquid into tank 20. If the level in tank 20 rises above the set point, the increased pressure will effect a change in the setting of valve 18 to divert the flow of milk from clarifier 14 through bypass line 24 to the supply line 12 on the suction side of pump 10.

The air pressure to operate the control system is supplied from a main air line 68 which is usually found in processing plants. Since the pressure in such lines is usually high, I prefer to provide pressure regulators 70 and 71 to reduce the line pressure to a lower value. Air at lower pressure from regulator 70 is supplied to controller 64 through line 72, which pressure is regulated by controller 64 according to the air pressure "signal" received from transducer 54 and then supplied to regulator 56.

Air at the lower pressure provided by regulator 70 is also used to supply the air flow to transducer 54. Thus, a branch line 74 is connected to the discharge side of regulator 70 and to the line 66 leading to the transducer 54. This circuit is the only circuit that carries an air flow; all other lines in the system are static air lines. Branch line 74 also contains a pressure regulator 76 and a fixed orifice 78. Regulator 76 acts to maintain a constant differential pressure across orifice 78. This results in a substantially constant rate of air flow from regulator 70 through line 66 to transducer 54. An air bypass line 80 connecting line 66 with regulator 76 also aids in maintaining this constant rate of flow to transducer 54. This portion of the system is more fully explained in my co-pending patent application Serial No. 100,583, referred to previously.

The air control system just described will maintain the liquid in tank 20 at the desired level at all times. There is, however, an emergency situation that exists if the liquid supply should become insufficient to maintain the operating level. If this happens, the level in the tank 20 will fall rapidly, and if the situation is not remedied immediately, the tank 20 may become empty and air only will then be sucked into the plate heat exchanger 28. This is highly undesirable since the heating medium will continue to flow into the heat exchanger 28 and cause the liquid to "burn-on" the plates. In my novel system, this situation is automatically remedied. Because the pressure transducer 54 will indicate the fluid level in the tank 20 anywhere from zero to the maximum level, a pressure switch 82 can be added to the air system and set to be actuated when the level falls to a predetermined level somewhat below the normal operating level. To accomplish this, the switch 82 is connected in transducer air line 66 and when actuated by decreasing pressure due to falling liquid level will deenergize a solenoid valve 84 in an air line 86 leading to valve 48 to cause the setting of valve 48 to be changed and thereby recirculate the flow of milk discharged from cooler 30 back into the tank 20 through line 52. Also, to assure that the operator is notified immediately of the milk supply failure, an alarm 88 (FIGS. 2 and 3) will be sounded upon actuation of pressure switch 82. This will attract the attention of the operator who can "acknowledge" the situation and stop alarm 88 by pressing push-button 90. When the operator has corrected the supply failure and the milk is again flowing into the system, the operator can press another push-button switch 92 to energize solenoid valve 84 and direct the flow of pasteurized milk to the outlet line 50. Alarm 88 and push-buttons 90 and 92 are preferably located on the central control panel 65.

The electrical control system is shown in FIG. 3 and since it requires relatively low voltage a transformer 94 is used to reduce the line voltage. Three relays are used to control the operations and the relay coils 96 (CR1), 98 (CR2) and 100 (CR3) are connected in parallel as shown. Solenoid valve 84 is connected across CR1 coil 96. Connected in series with CR1 coil 96 is the normally open push-button switch 92 that when pressed will energize solenoid valve 84 to actuate valve 48 and direct the liquid flow into line 50. Also connected in series with CR1 coil 96 is a normally closed push-button switch 102 that when pressed will deenergize solenoid valve 84 to actuate valve 48 and recirculate the liquid flow back to tank 20 through line 52.

A holding circuit is connected across push-button switch 92 and contains a set of normally-open contacts 104 (CR1) and a set of normally-closed contacts 106 (CR2). Another set of normally-closed contacts 108 is connected in parallel with CR1 coil 96 to control indicator light 110. Indicator light 111 is connected across CR1 coil 96 and will be lit whenever CR1 coil 96 is energized.

Pressure switch 82 is connected in series with CR2 coil 98, and will be open at all times when the liquid supply to tank 20 is sufficient to maintain the normal operating level. As long as pressure switch 82 is open, CR2 coil 98 will be deenergized.

In addition to the set of normally-closed contacts 106, CR2 coil 98 controls a set of normally-open contacts 112 in circuit with CR3 coil 100, alarm 88, and indicator light 114.

CR3 coil 100 controls a set of normally-closed contacts 116 connected in series with alarm 88 and a set of normally-open contacts 118 in a holding circuit connected across normally-open push-button 90 which when depressed will stop the alarm 88.

The operation of my novel system will now be summarized for purposes of clarity.

With the system in normal operation, the pumps 10 and 36 and clarifier 14 will all be operating, and milk will be discharged from the heat exchanger 28 into the discharge line 50. The normal operating level in the balance tank 20 will be maintained by transducer 54 controlling valve 18 which modulates the liquid flow into the tank 20. With the system in normal operation, the indicator light 111 on control panel 65 will be lit. CR1 coil 96 will be energized thereby holding contacts 104 closed and contacts 108 open. Solenoid valve 84 will be energized to actuate valve 48 and direct the liquid being discharged from heat exchanger 28 into line 50. Pressure switch 82 will be open and therefore CR2 coil 98 will not be energized and contacts 112 will be open. Indicator lights 110 and 114 will not be lit.

In case of a deficiency in the milk supply, the level in tank 20 will start to fall and when it approaches the preselected low level point, the transducer 54 will transmit the lower pressure to pressure switch 82 which will then close and remain closed as long as the liquid level in tank 20 remains low. Closing of switch 82 will cause several things to occur simultaneously. CR2 coil 98 will be energized opening contacts 106 and breaking the circuit to the CR1 coil 96. This de-energizes solenoid valve 84, and the indicator light 111 will go out. Deenergization of solenoid valve 84 will cause the valve 48 to direct the flow from heat exchanger 28 into the re-circulation line 52 leading to the balance tank 20, and the indicator light 110 will go on indicating that the liquid is now being re-circulated to tank 20. Energization of CR2 coil 98 will also cause contacts 112 to close lighting the indicator light 114 and causing the alarm 88 to sound.

Lighting of indicator lights 110 and 114 and sounding of the alarm 88 will attract the attention of the operator. To remedy the situation, the operator should first press the push-button switch 90 to stop the alarm 88 from sounding, and as soon as he has corrected the supply deficiency, the level in the balance tank 20 will start to rise. This will cause pressure switch 82 to open deenergizing CR2 coil 98 and opening contacts 112. Also, the indicator light 114 will go out informing the operator that the supply is now sufficient for normal operation. The operator should then press push-button 92 to cause CR1 coil 96 and solenoid valve 84 to become energized. Energization of solenoid valve 84 causes the valve 48 to direct the liquid flow back into discharge line 50 and the system is in normal operation. Energization of CR1 coil 96 will also open contacts 108 causing indicator light 110 to go out, and simultaneously indicator light 111 will be lit showing that the system is in normal operation.

If at any time the operator desires to divert the discharge flow from heat exchanger 28 back into balance tank 20, he may do so by pressing the push button 102. This will deenergize solenoid valve 84 causing the flow to be directed into re-circulation line 52. This will also cause the indicator light 111 to go out, and the re-circulation indicator light 110 to be lit. The system can be put back into normal operation by merely pressing push button switch 92.

Note that the three indicator lights 110, 111, and 114 on control panel 65 indicate the operating condition of the system at all times. Thus, there is no guesswork connected with operation of this system. The level will be maintained in balance tank 20 by reason of the transducer 54 which controls the valve 18 that modulates the flow according to the level in the tank 20. Also, regardless of the liquid supply, liquid will be kept flowing at all times through the heat exchanger 28 thereby preventing troublesome burn-on.

It is therefore obvious that my novel system provides fully automatic and substantially fool-proof operation that will keep the product flowing through the system at all times. The system is relatively simple and can be adapted to existing as well as new systems. The standard high-temperature short-time milk pasteurization system has been shown for purposes of illustrating the principles of my invention, but it will be obvious to those skilled in the art that the principles of my invention can also be adapted to other liquid processing systems using balance tanks and the like. It is my intention that all such adaptations and other variations and modifications obvious to those skilled in the art be included within the scope of my invention as defined by the following claims.

I claim:

1. A liquid processing system comprising a liquid processor, liquid supply and discharge lines connected to said processor, a surge tank in said supply line, means to pump the liquid through said system, and level control means for controlling the level of liquid in said tank, said level control means comprising a first valve in said supply line upstream from said tank, means responsive to a liquid level in said tank to control the operation of said valve to maintain a selected operating level in said tank, a second valve in the processor discharge line, and a re-circulating line connecting said discharge line and tank through said second valve, the operation of said second valve being controlled by said level responsive means when the liquid level in the tank falls to a predetermined level below the operating level.

2. In a liquid processing system having a liquid supply source, a surge tank, and liquid processor having an outlet line, all connected in series flow relationship, means to maintain a selected level of liquid in said tank regardless of the sufficiency of said supply source, said last mentioned means comprising a valve connected in the outlet line of said liquid processor, a recirculation line connected to the outlet line of said liquid processor through said valve and discharging into said tank, a transducer responsive to the liquid level in said tank, control means operatively connecting said transducer and said valve to actuate said valve when the level in said tank falls to the preselected level thereby closing off the outlet line and directing the liquid discharged from said processor through said recirculation line into said tank, and means to actuate said valve when said level rises above the preselected level to close off the recirculation line and direct the liquid through said outlet line.

3. In a liquid processing system having a liquid supply line, a surge tank, and a liquid processor having an outlet line, all connected in series flow relationship, means to maintain a selected level of liquid in said tank regardless of the sufficiency of said supply source, said last mentioned means comprising an air-operated valve connected in the outlet line of said liquid processor, a recirculation line connected to the outlet line of said liquid processor through said valve and discharging into said tank, a pressure-sensitive device responsive to the liquid level in said tank, air supply lines for said device and said valve, a solenoid valve in the air supply line to said air-operated valve to control the air flow thereto, and a pressure-responsive switch in the air line to said device and electrically connected to said solenoid valve to actuate same and thereby actuate said air-operated valve to direct the liquid flow from said processor into said recirculation line when the liquid level in said tank falls to a preselected level.

4. In the liquid processing system of claim 3, an alarm operatively connected to said pressure switch and actuated thereby when the liquid level in said tank falls to the preselected level.

5. In the liquid processing system of claim 3, means to actuate said solenoid valve and thereby actuate said air-operated valve to return the liquid flow to said outlet line.

6. A liquid processing system comprising a liquid processor, liquid supply and discharge lines connected to said processor, a surge tank in said supply line, and means to pump the liquid through said system, and level control means for controlling the level of liquid in said tank, said level control means comprising an air-operated first valve in said supply line upstream from said tank, a pressure sensitive device responsive to the liquid level in said tank to control the operation of said first valve to maintain a selected operating level in said tank, a second air-operated valve in the processor discharge line, air supply lines for said pressure sensitive device and said first and second valves, remote control means interconnecting the air supply lines of said pressure sensitive device and said first and second valves to control the operation of said valves in response to pressure variations transmitted thereto by said pressure sensitive device, and a recirculation line connecting said discharge line and tank through said second valve, the operation of said second valve being controlled through said remote control means by said pressure sensitive device when the liquid level in the tank falls below the selected operating level.

7. In a sanitary system for processing a liquid comestible product, said system having a liquid supply source, a surge tank, and a liquid product heater having an outlet line, all connected in series flow relationship, means to maintain an operating level of a liquid in said tank regardless of the sufficiency of said supply source, said last mentioned means comprising a valve connected in the outlet line of said liquid heater, a recirculation line connected to the outlet line of said liquid heater and discharging into said tank, a transducer responsive to the liquid level in said tank, and control means operatively connecting said transducer and said valve to actuate said valve when the level in said tank falls below the operating level thereby closing said valve and directing the liquid discharged from said heater through said recirculation line into said tank.

References Cited by the Examiner
UNITED STATES PATENTS

| | | | |
|---|---|---|---|
| 737,807 | 9/03 | Westinghouse | 137—118 |
| 2,197,118 | 4/40 | Astle | 257—305 |
| 2,651,259 | 9/53 | Brush | 103—5 |
| 2,717,078 | 9/55 | Levi | 137—115 XR |
| 2,928,037 | 3/60 | Lawrence | 137—392 X |
| 3,101,041 | 8/63 | Hallstrom | 165—40 X |

WILLIAM F. O'DEA, *Primary Examiner.*

ISADOR WEIL, *Examiner.*